Figure 1:
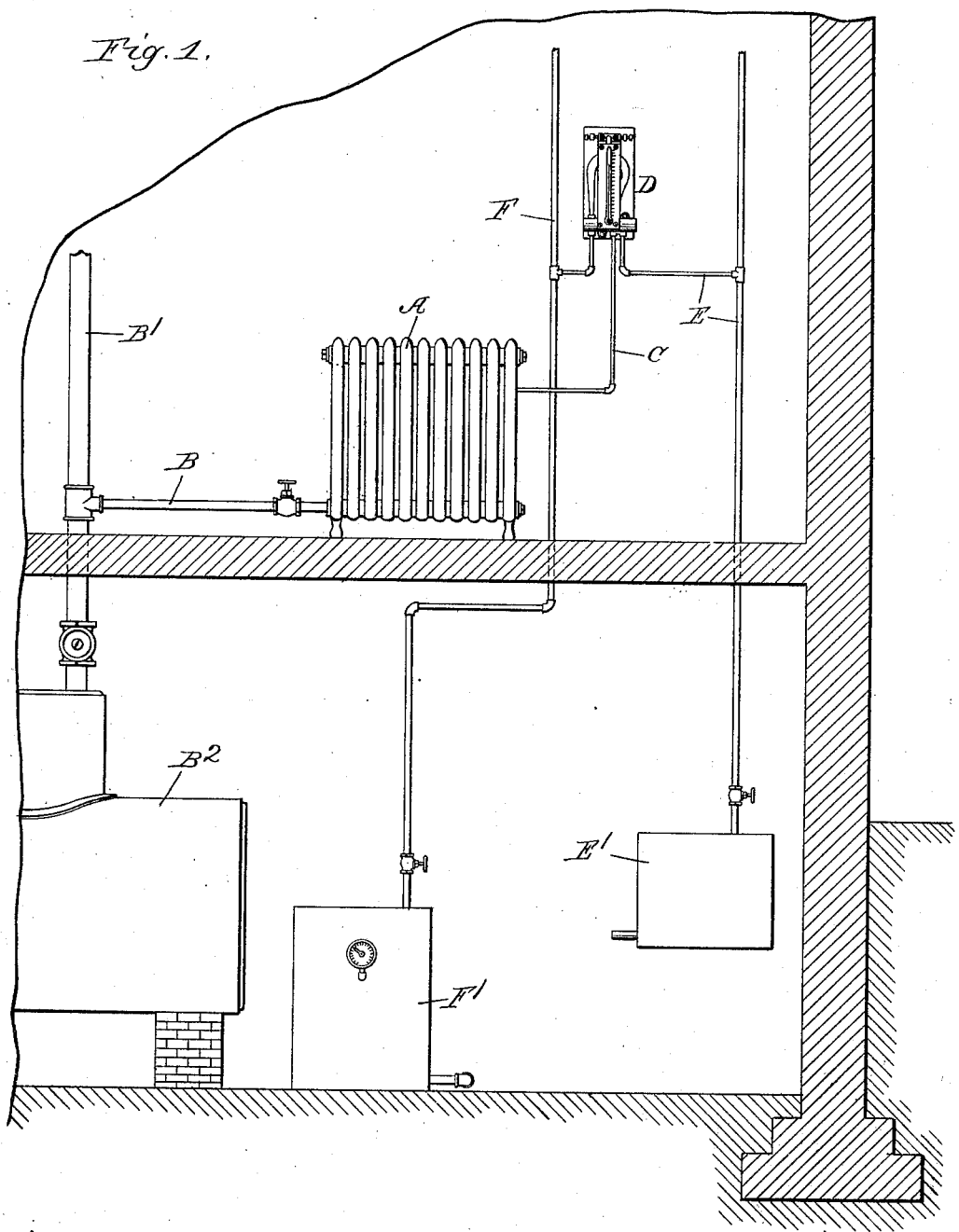

No. 686,916. Patented Nov. 19, 1901.
C. G. ARMSTRONG.
PROCESS OF REGULATING HEATING DEVICES OR SYSTEMS.
(Application filed July 29, 1901.)

(No Model.) 3 Sheets—Sheet 1.

Witnesses
Edward T. Wray
Homer L. Kraft

Inventor
Charles G. Armstrong
by Parker & Carter
Attorneys.

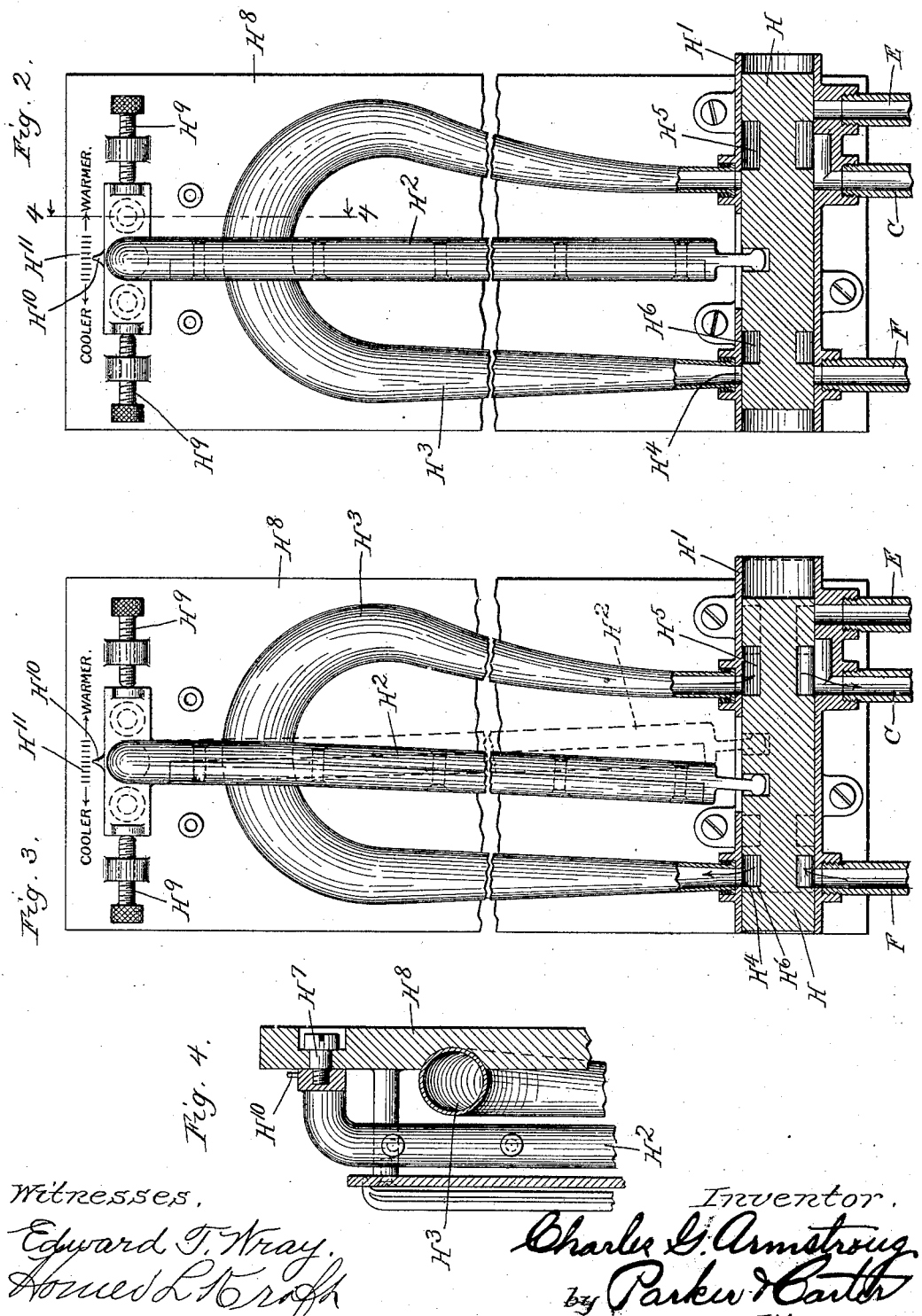

No. 686,916. Patented Nov. 19, 1901.
C. G. ARMSTRONG.
PROCESS OF REGULATING HEATING DEVICES OR SYSTEMS.
(Application filed July 29, 1901.)
(No Model.) 3 Sheets—Sheet 3.
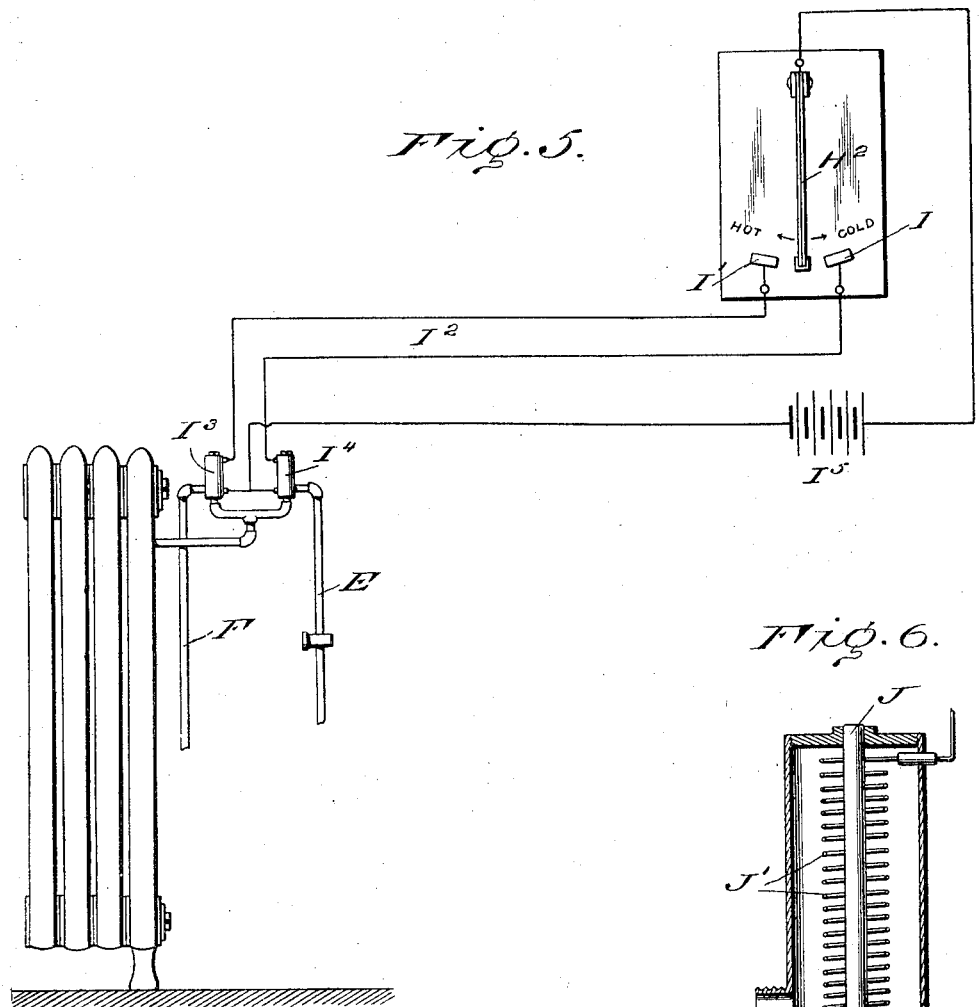
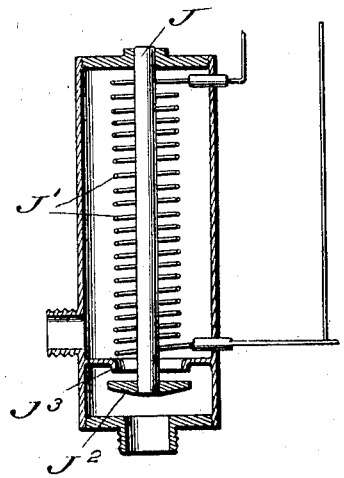
Witnesses
Harry A. Allen
Arthur Browning
Inventor
Charles G. Armstrong
by Parker & Carter
Attorneys

UNITED STATES PATENT OFFICE.

CHARLES G. ARMSTRONG, OF CHICAGO, ILLINOIS.

PROCESS OF REGULATING HEATING DEVICES OR SYSTEMS.

SPECIFICATION forming part of Letters Patent No. 686,916, dated November 19, 1901.

Original application filed September 2, 1898, Serial No. 690,062. Divided and this application filed July 29, 1901. Serial No. 70,053. (No model.)

*To all whom it may concern:*

Be it known that I, CHARLES G. ARMSTRONG, a citizen of the United States, residing at Chicago, in the county of Cook and State of Illinois, have invented a certain new and useful Improvement in Processes of Regulating Heating Devices or Systems, of which the following is a specification.

My invention relates to heating systems, and has for its object to provide a new and improved art or process or method of regulating or controlling such heating systems.

My invention is illustrated in the accompanying drawings, wherein—

Figure 1 is a diagrammatic view of a portion of a steam-heating system embodying my invention. Fig. 2 shows one form of regulating device in part section. Fig. 3 is a view similar to Fig. 2, showing the parts differently disposed. Fig. 4 is a section on line 4 4, Fig. 2. Fig. 5 is a diagrammatic view showing a modified construction for carrying my process into effect. Fig. 6 is a section through one of the electrically-operated valves shown in Fig. 5.

Like letters refer to like parts throughout the several figures.

In designing heating systems—such, for example, as steam-heating systems—it is the practice to make the heater or radiator with sufficient heating or radiating surface to properly heat the apartment during the most severe weather. It is also customary to supply such radiators with an automatic air-valve which permits the air to escape from the radiator when steam is admitted and which is affected by the heat of the steam so as to close when the radiator is entirely filled with steam. Under such conditions the entire capacity of the radiator is used at all times or the radiator is entirely shut off. As the entire capacity of the radiator is seldom necessary, because of the fact that the weather is seldom, if ever, cold enough to require this entire capacity, it follows that the system lacks economy and that it is difficult, if not impossible, to keep the temperature of the apartment to be heated at the right point. By means of my invention I provide a method or process of regulating such heating systems so as to render them efficient and economical and so as to produce an equable temperature in the apartment to be heated, the heating capacity of the radiator being controlled to correspond with the requirements made necessary by the variation of the temperature of the outside atmosphere.

In my application Serial No. 690,062, filed September 2, 1898, and pending simultaneously with the present application, I have illustrated and claimed a particular apparatus for carrying out my process or method, and as the method or process could not be claimed in said prior application I am claiming it in the present application, which is a division of my prior application required by the Office, right for which was reserved in said prior application.

In my original application I have shown a mechanism for regulating heating devices, and the regulation is performed by inserting into the heater while the steam or other heating agent is contained therein a displacing agent, such as air, and regulating or checking the insertion of the displacing agent, so as to prevent the too-rapid insertion of the displacing agent. In this original application I used a thermostat, which controls the admission and exhaust of this displacing fluid, and as the thermostat is not instantly responsive to the variations in the heating capacity of the radiator or heater it became necessary to provide some means for preventing all the steam from being blown out of the radiator when connected with the source of this displacing fluid, thus retarding, as it were, the insertion of the displacing fluid until the thermostat would have time to adjust itself and respond to the variation in temperature caused by the variation of the heating capacity of the heater or radiator.

In my original application I selected a particular apparatus for purposes of illustration which I thought would perhaps aid as well, if not better, than any other in making my process clear and the explanation thereof readily comprehended.

Broadly stated, my process may be said to comprise two acts—first, varying the effective radiating area of a heater responsive to variations of temperature, and, second, modifying by a checking action independent of the temperature of the apartment to be heated, the act varying the effective radiating area before all the heating agent is expelled from the heater.

The foregoing statement will be more readily understood when we remember that the apartment to be heated does not heat instantly or cool instantly, but takes a considerable interval of time to heat and cool even when the heater—for example, a radiator—is turned completely on or off. If, therefore, the device which first acts to bring about a variation of the effective radiating area of the heater acts in response to the variation of the temperature of the apartment, it cannot respond at once to the variations of the effective radiating area of the heater, but has, as it were, a lag—i. e., it lags behind—and must wait until the intervening medium (the air in the room) is brought to the proper temperature by the variation of the radiating area. If, however, the act of varying the effective radiating area of the heater is allowed to continue without check or hindrance during this time—that is, this lag—it will be seen that when the device does act it is too late to be effective, for the radiating area will have been varied to too great an extent, and the evil instead of being remedied is simply changed in character, the apartment becoming too cold if previously too hot, and vice versa, the heater being completely shut off or completely turned on. To remedy this evil and overcome this lag, I check the variation of the effective radiating area independent of the temperature of the apartment to be heated, and thus secure the variations of the heating area I desire.

Stated in another way, my invention consists in the method or process of regulating heating devices, which consists in inserting into the heater while the heating fluid is confined therein a displacing fluid and regulating the relative pressure of the heating and displacing fluid, so as to prevent the too-rapid insertion of the displacing fluid.

It is of course evident that various apparatus may be used to carry out my process, and for purposes of illustration I have set out diagrammatically several constructions which may be utilized for this purpose. I of course do not limit myself to such constructions.

I will now describe the particular construction I have selected for purposes of illustration.

Referring now to Fig. 1 of the drawings, I have shown a radiator A, connected by the pipe B with the heating-main B', connected with the boiler B². Leading from the radiator is a pipe C, which may exhaust into the air, but which is preferably connected by the exhaust-pipe E with some suitable pump or other exhaust device E', the regulating device proper, D, being associated with said exhaust-pipe in any desired manner, so as to be located at a convenient point in the room.

It is of course evident that any exhaust device may be used, and for purposes of illustration I have simply shown such exhaust device diagrammatically. An air-supply pipe F also leads from the radiator to some suitable source of air-supply F', which for purposes of illustration is shown as a tank, the regulating device being associated with said air-supply pipe in any desired manner. In the construction shown in Fig. 1 the pipe C is common both to the exhaust from the radiator and the admission thereto.

Referring now to Fig. 2, I have shown diagrammatically and in detail one form of the regulating device proper. As illustrated in this figure, I provide a suitable controlling device or valve H, contained in a suitable casing or cylinder H', to which are connected the pipes C, E, and F. Associated with the part H is a suitable device which responds to variations in temperature. It is of course evident that any construction may be used, and for purposes of illustration I have shown a simple thermostat $H^2$, made of metals expanding unequally under varying temperature. Associated with the thermostat $H^2$ is a tube or passage-way $H^3$, some part of which is of greater cross-sectional area than the inlet $H^4$. The part or valve H is provided with suitable ports $H^5$ and $H^6$, adapted to control the passage of the air or steam through the pipes C, E, F, and $H^3$. The thermostat $H^2$ is movably mounted at its upper end, so that it may be adjusted to act when the temperature in the room reaches any given point. This result may be obtained in any convenient manner. As herein illustrated, the thermostat is held in position by means of the projection $H^7$, which extends through the support $H^8$ and works in a suitable groove, so that the thermostat may be shifted laterally. Two set-screws $H^9$ are associated with the thermostat, and adjustment may be had by adjusting these set-screws in any desired manner. A suitable indicator $H^{10}$ is associated with the thermostat and is opposed to a suitable scale $H^{11}$, divided into degrees representing temperature, so that the device may be adjusted to operate when the temperature in the room reaches any given point.

I have shown a modified construction in Fig. 5. This figure shows an electrically-operated device. Associated with the thermostat $H^2$ are two electrical contacts I I', which are connected by conductors $I^2$ with electrically-operated valves $I^3$ $I^4$, the thermostat $H^2$ being included in the circuit. A source of electric supply or battery $I^5$ is connected with the circuit and may be located at any convenient place. The electrically-operated valves may be of any suitable construction.

In Fig. 6 I have shown a sectional view of one of these valves. In this valve the valve-stem J is made of some suitable composition having a high coefficient of expansion. This valve-stem is surrounded by a coil J' of wire, preferably of high resistance. The position of the valve $J^2$ with relation to its seat $J^3$ is controlled by means of the contraction and expansion of the stem J, due to variations in temperature.

I have illustrated my invention as applied to a single-pipe system; but it is of course evident that it may be applied to a system where a separate return-pipe is used. I have not illustrated these various forms for the reason that the application of my invention to them will be clear to those versed in the art.

It is of course evident that some of the parts herein illustrated may be omitted and others used with parts not herein shown without departing from the spirit of my invention. It is further evident that my process is applicable to systems working under pressure, or what may be termed "vacuum" systems. The constructions hereinbefore described may be used on either of such systems; but in case my process is applied to a vacuum system I prefer to insert between the radiator and the source of supply of the heating fluid an automatic valve which closes when the radiator is connected with the source of air-supply and which opens when the radiator is connected with the exhaust device, thus letting the steam into the radiator in a single-pipe system and letting the water of condensation out, and this valve may be placed in the pipe B of Fig. 1.

I have described in detail several constructions which may be used in carrying out my process for the purpose of indicating that the mechanism for carrying out such process may have many different forms. This mechanism may be automatic or hand-controlled or of any other form capable of producing the desired result. I therefore do not limit myself in carrying out my process to the apparatus or mechanism herein illustrated.

The use and operation of my invention are as follows: Referring to the mechanism shown in Figs. 1 to 4, inclusive, suppose the steam is turned on and the radiator filled with such steam, so that all of its radiating capacity is used. When the steam is turned on, the thermostat and associated parts will be in the position illustrated in Fig. 2. The temperature in the apartment under such conditions will soon rise above the predetermined point for which the mechanism is set, and the lower end of the thermostat $H^2$ will be moved to the left, the parts occupying the position illustrated in Fig. 3. In this position the source of air-supply is connected by pipe F, port $H^6$, pipe $H^3$, port $H^5$, and pipe C with the radiator, and the air is inserted into such radiator while the steam is confined therein, thus forcing back a portion of the steam and occupying its place, so as to reduce the active heating-surface of the radiator by expelling the steam from some of the coils. If the air were admitted freely into the radiator, as would be the case if there were no checking device and the connection continued until the thermostat responded to the lower temperature of the apartment, such air would soon expel all of the steam, and instead of regulating the radiator or heater would practically shut it off entirely, and the air would also pass into the system. In order to prevent this result, I provide some suitable means for checking the insertion of the air or displacing agent. It will thus be seen that by this method the steam will not be driven out of the radiator and that only a portion of such steam will be displaced by the air because of this checking action and that the amount of displacement can be adjusted to suit the conditions met by properly adjusting the mechanism.

In the construction shown in Figs. 1 to 4 I cut off the supply of displacing fluid before the lowering of the temperature in the apartment causes the thermostat $H^2$ to act by providing a checking device which is independent of the temperature of the apartment and which consists of the passage-way or pipe $H^3$, with an enlarged portion in proximity to the thermostat. When the air under pressure flows from the pipe F to the enlarged portion of the pipe or passage-way $H^3$, it suddenly expands, and this expansion cools the pipe $H^3$. This sudden cooling of the pipe $H^3$, in view of its association with the thermostat $H^2$, at once affects the thermostat and causes it to move back to the position shown in Fig. 2, thus cutting off the supply of air. This action preferably cuts off the supply of air before the radiating-surface of the radiator is reduced the proper amount. The heating fluid in the radiator gradually condenses, so as to vary the space free to be occupied by the displacing fluid, and the high temperature in the room will cause the device to act again in the manner above described, letting in more air to fill this space and perhaps to displace more steam, all depending on the adjustment, and the action continues until the radiating-surface is reduced the proper amount. I have only shown the mechanism diagrammatically, and it is of course to be understood that the mechanism may be adjusted so as to permit any desired amount of air to enter at any given movement of the valve H. When so adjusted, the valve moves over, admits a little air, and is moved back again automatically, and this intermittent operation is continued, admitting successive small portions of air, until the radiating-surface is reduced sufficiently. The device then remains in the normal position shown in Fig. 2. Expressing the action in other words, it may be said that this construction retards the admission of the displacing fluid, so as to prevent its too-rapid admission. If now the temperature in the apartment falls below a predetermined point, the thermostat will be moved to the left, the parts taking the position illustrated in dotted lines in Fig. 3. When in this position, the pipe C from the radiator is connected with the exhaust-pipe E, thus permitting the air to pass from the radiator, so as to increase the active heating capacity, the steam occupying the space from which the air is removed. The air in this case passes through the pipe C, then through port H⁵, and then through exhaust-pipe E. The passage of air, which because of being in the radiator is warm, heats the valve H and affects the thermostat, so as to cause it to move to the left and cut off the exhaust, and hence an intermittent exhaust similar to the intermittent admission is produced.

I have not attempted in any of the drawings to show the exact and proper disposition of the parts or the dimensions of such parts, as all these factors will depend upon the conditions to be met and will readily occur to and be readily produced by those versed in the art when the conditions under which the apparatus is to act are ascertained.

Referring now to Figs. 5 and 6, I have shown an electrically-operated device by means of which my process may be carried into effect. In this construction when the temperature of the room rises above the temperature for which the device is adjusted the thermostat moves over and makes contact with the contact I'. This completes the circuit through the valve I³ and heats the coil J', surrounding the valve-stem J. The heating of this valve-stem causes it to expand, so as to move the valve J² away from its seat J³. This opens the passage-way leading from the source of air-supply to the radiator and admits air into the coils of said radiator, so as to reduce its active heating-surface. The rush of cool air through the valve contracts the valve-stem and causes the valve to close after a small amount of air has entered the radiator. The checking action is here produced by a valve or device associated directly with the heater. It will thus be seen that the relative pressure of the air and steam is thus regulated and the intermittent admission of the air continues until the radiating-surface has been reduced a sufficient amount. When this point is reached, the thermostat is moved so as to break the circuit. If the temperature falls below a predetermined point, the thermostat makes contact with the contact I, and the valve I⁴ is operated so as to open the exhaust-passage and allow a portion of the air to be exhausted.

The two forms of apparatus I have shown in the drawings illustrate very forcibly the range of the apparatus that may be used for carrying out my process, and without going further into detail it will be noted that the checking device in Fig. 1 is associated directly with the device which starts the action of varying the effective area of the heater, while in Fig. 5 the checking device is away from such device and has no direct effect upon it.

Taking one form of statement of my invention it may be said that I have here a process of regulating heating devices which consists not simply in inserting a displacing agent into the heater, but in regulating the heater by regulating the insertion or withdrawal of the displacing agent, so as to prevent the too-rapid insertion or withdrawal of the displacing agent and the too-extended removal of the heating fluid. Stating the matter in another way, I have here a process of regulating heating devices which consists in inserting a displacing agent into the heater responsive to variations in temperature of the apartment to be heated and automatically checking the insertion of the displacing agent independent of variations in temperature of said apartment and while a portion of the heating agent remains in the heater, so as to regulate the effective area of the heater. It will therefore be seen that one of the objects of my invention is to provide a method of controlling the temperature of an apartment, which consists in increasing or decreasing the effective radiating area of a heater upon a departure from a predetermined normal temperature by a fractional amount or amounts of the entire radiating area sufficient to restore the normal temperature.

I claim—

1. The process of regulating the temperature of an apartment consisting of two acts, first varying the effective radiating area of a heater responsive to variations of temperature and second modifying by a checking action, independent of the temperature of the apartment, the act of varying the effective radiating area and before all the heating agent is expelled from the heater.

2. The process of controlling the temperature of an apartment which consists in automatically increasing or decreasing the effective radiating area of a heater situated therein, upon a departure from a predetermined normal temperature, by a fractional amount or amounts of the entire radiating area, sufficient to restore the normal temperature.

3. The process of regulating heating devices, which consists in inserting a displacing agent into the heater responsive to variations in temperature of the apartment to be heated and automatically checking the insertion of the displacing agent independent of variations in temperature of said apartment and while a portion of the heating agent remains in the heater, so as to regulate the effective area of the heater.

4. The process of regulating heating devices which consists in utilizing a displacing agent to displace a portion of the heating fluid and withdrawing a portion of the displacing agent when the temperature of the apartment to be heated falls below a predetermined point, and automatically checking the withdrawal of said displacing agent independent of the temperature of said apartment, before it has all been withdrawn.

5. The process of regulating heating devices which consists in inserting into or withdrawing from the heater a displacing agent in response to variations in temperature of the apartment to be heated, and automatically checking the insertion or withdrawal of the displacing agent independent of variations in the temperature of said apartment so as to regulate or vary the area of the heater occupied by the heating fluid.

6. The process of regulating heating devices which consists in inserting a displacing agent into the heater when the temperature of the apartment to be heated rises above a predetermined or normal point and automatically checking this insertion before the temperature falls to the predetermined or normal point in response to the insertion of said displacing agent and before the heater becomes filled with said displacing agent.

7. The process of regulating heating devices which consists in connecting the heater with a source of air-supply, when the temperature of the apartment to be heated rises above a predetermined or normal point, and automatically checking the flow of air in the heater independent of the temperature of said apartment and while a portion of the heating fluid remains in the heater, so as to regulate the effective area of the heater.

8. The process of regulating steam-radiators which consists in inserting a quantity of air into the radiator responsive to variations in temperature of the apartment to be heated and automatically checking the insertion of air independent of variations of temperature of said apartment and while a portion of the steam remains in the radiator, so as to regulate the effective area of the radiator.

9. The process of regulating radiators which consists in connecting a radiator with a source of air-supply or an exhaust device responsive to variations in temperature of the apartment to be heated, and automatically checking the insertion or withdrawal of air independent of the temperature of said apartment and before the radiator is completely filled with or emptied of air, so as to regulate the effective heating area of the radiator.

10. The process of regulating the temperature of an apartment which consists in inserting a displacing agent into the heater, which heats the apartment, by an intermittent or step-by-step action when the temperature of said apartment rises above a predetermined or normal point.

11. The process of regulating the temperature of an apartment which consists in inserting a displacing agent into, and withdrawing it from the heater which heats the apartment, by an intermittent or step-by-step action, in response to variations in temperature of said apartment, so as to gradually vary the effective radiating area of the heater.

CHARLES G. ARMSTRONG.

Witnesses:
DONALD M. CARTER,
HOMER L. KRAFT.